No. 607,268. Patented July 12, 1898.
H. P. A. NIELSEN.
COOKING APPARATUS.
(Application filed Sept. 3, 1897.)
(No Model.)
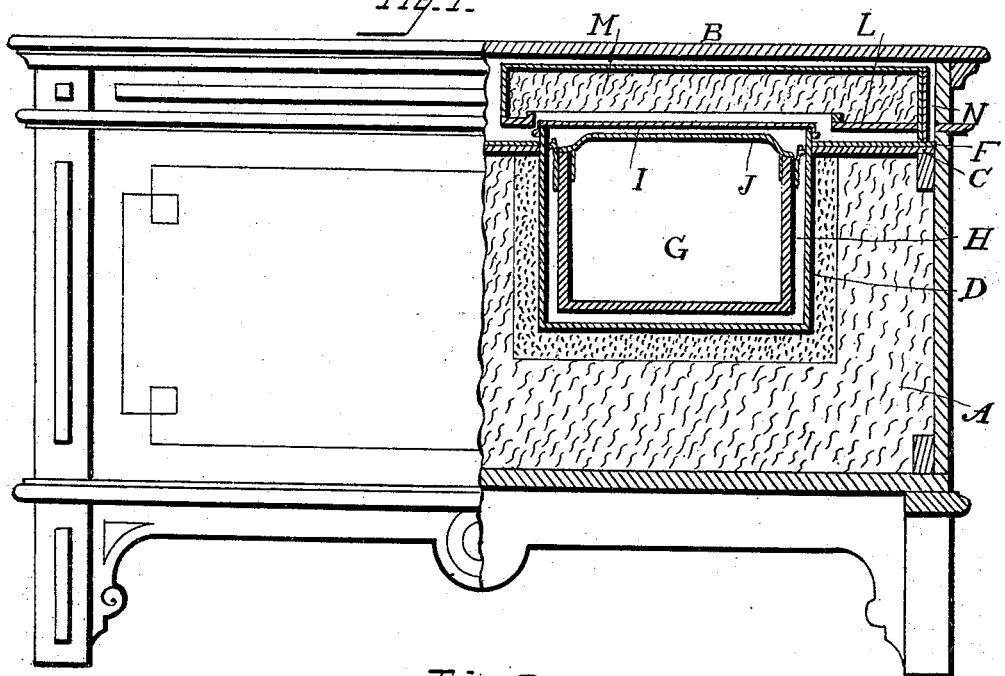
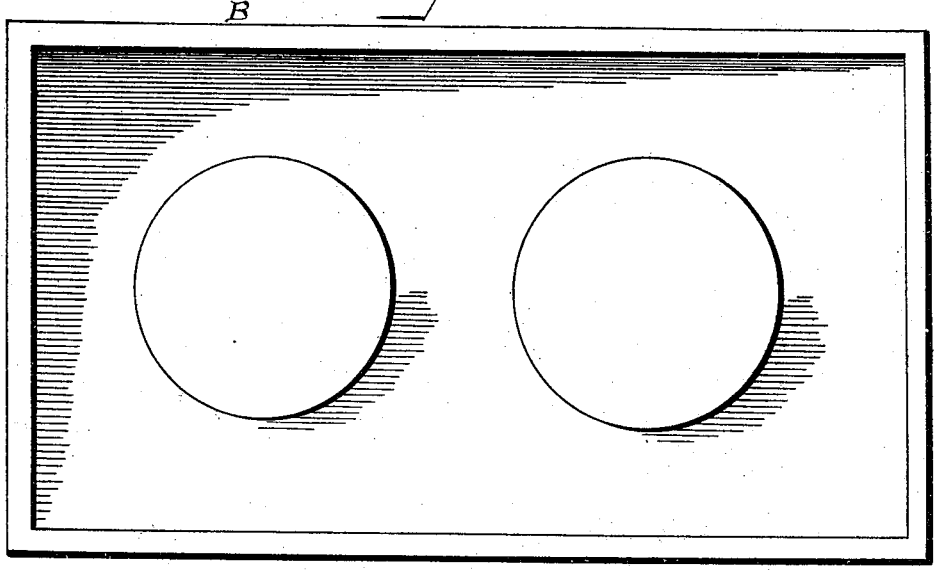

UNITED STATES PATENT OFFICE.

HANS PETER AUGUST NIELSEN, OF NEWPORT NEWS, VIRGINIA.

COOKING APPARATUS.

SPECIFICATION forming part of Letters Patent No. 607,268, dated July 12, 1898.

Application filed September 3, 1897. Serial No. 650,504. (No model.)

*To all whom it may concern:*

Be it known that I, HANS PETER AUGUST NIELSEN, a citizen of the United States, residing at Newport News, in the county of Warwick and State of Virginia, have invented certain new and useful Improvements in Cooking Apparatus; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to an improvement in cooking apparatus; and it consists in an outside inclosing box or casing which is suitably packed with heat-non-conducting material and is provided with an internal horizontal support, combined with a cooking-pot in which the cooking vessels containing the food are placed and a suitable cover for the pot, as will be more fully described hereinafter.

The object of my invention is to produce an apparatus in which articles of food can be deposited after they have once been brought to the boiling-point and in which the heat of the food is retained, so that the food will continue cooking without the aid of further heat from the fire, and thereby effect a great saving of fuel and time.

In the accompanying drawings, Figure 1 is a side elevation, partly in section, of an apparatus which embodies my invention. Fig. 2 is a plan view of the apparatus with the cover removed.

A represents a suitable box or inclosing case made of wood or other suitable material and which is provided with the cover B, which is lined upon its inner side with cotton, felt, or other suitable material having heat-non-conducting properties. Inside this box is placed the horizontal partition C, which forms a support for the cooking-pot D, which is placed thereon, and from which cooking-pot extends a suitable metallic plate F, which rests upon the top of the partition C and supports the pot D in position. This pot D is formed of sheet metal or any other suitable material and is large enough to allow the cooking vessel G to be placed therein and yet leave a narrow air-space H between them. This vessel G is supported by means of ears, which are secured to the vessel about its outer circumference and bear frictionally against the inner walls of the pot D. The pot D is provided with the closely-fitting cover I, and the cooking vessel is provided with one, J, of its own, so as to prevent any possible escape of steam or heat.

Inside of the box or casing A is placed the horizontal partition L of wood, and between this partition L and the top B the space is packed tightly with any suitable non-conducting material which will prevent the radiation of heat. This packing material is placed inside of the metal box M, which is placed over the top of the pot D, and prevents any radiation of heat vertically. Between the two partitions C and L a suitable packing of any material is placed, so as to avoid any lateral radiation of heat. Between the side of the casing A and the lid B may be formed a narrow air-space N, if so desired, or the box may be lined with any suitable non-conducting material, if so preferred. The space between the cooking-pot D and the lower portion of the casing A is packed solidly with any suitable heat-non-conducting material; but I prefer to use a thick packing of cotton immediately around the pot and to fill the remainder of the casing with hay or other similar material, which is packed solidly therein.

The cooking-pot being thus surrounded at all sides, so as to prevent any possible radiation of heat, it is only necessary to bring the article to a boil in the cooking vessel G and then place it in the pot D and tightly close the pot. The heat of the boiling water is sufficient to continue the cooking without the need of fire, thus effecting a great saving both in fuel and in time and labor.

As here shown, the cover is made separate from the metal box M, and hence after the cover is raised the box, including the partitions L, must be raised before access can be had to the pot D. After an article has been brought to a boil care must be taken that there is no escape of steam, and hence the cover J is provided with suitable flanges, which snugly fit the top of the vessel G.

Having thus described my invention, I claim—

In a cooking apparatus, the inclosing case, a suitable packing material placed therein, the cooking-pot D having its lower portion surrounded by the said packing and provided with the plate F which extends outwardly from the pot, the horizontal partition C upon which the plate rests, the upper edge of the pot being made to project above the plate F, and the cover I for the pot; combined with the cover B, a metal box M placed in the cover and which box is filled with a suitable packing, there being made a suitable opening through the bottom of the box just over the cover I, substantially as shown and described.

In testimony whereof I affix my signature in presence of two witnesses.

HANS PETER AUGUST NIELSEN.

Witnesses:
 HENRY NEUMANN,
 JAMES LANE.